Patented June 14, 1938

2,120,635

UNITED STATES PATENT OFFICE 2,120,635

PURIFIED ERGOT PRODUCT

Marvin R. Thompson, Catonsville, Md., assignor to John Wyeth & Brother, Incorporated, Philadelphia, Pa., a corporation of Delaware No Drawing. Application July 6, 1935,
Serial No. 30,153

8 Claims. (Cl. 87—28)

This invention relates to a purified ergot product and a process for preparing it.

Ergot is widely utilized for medicinal purposes and possesses valuable therapeutic properties when properly prepared.

It is the object of the present invention to provide a liquid extract of ergot which retains the desirable oxytocic activity of ergot, but is substantially free from the undesirable toxicity usually present in the ordinary crude extracts now available.

I have found, after extensive and appropriate pharmacological studies that the hitherto known alkaloids of ergot, such as ergotoxine, ergotamine, ergotinine, ergotaminine, sensibamine and ergoclavine impart to extracts of ergot an undesirable toxicity without contributing proportionately to the desirable and necessary oxytocic activity of such extracts.

I have discovered that the main carrier of the clinically desirable oxytocic activity of ergot is a hitherto unknown specific alkaloid of ergot. I have isolated this new alkaloid in pure form and have given it the name ergostetrine.

In my copending application, Serial No. 740,199, filed August 16, 1934, I have described a specific method of isolating this new alkaloid.

The new alkaloid has some of the characteristics of the known alkaloids of ergot, but differs therefrom in many respects.

It is insoluble in petroleum ether, but definitely more soluble in water, and less soluble in ethanol, ether, benzine, methanol, the chlor-ethylenes and the chlor-methanes, than the known alkaloids. It is soluble in water and in alcohol without the aid of acid. It is not precipitated by alkalis from water solutions of its salts. It will remain in ether solution after the addition of acid without precipitation. Boiling temperatures gradually destroy the alkaloid in aqueous medium, but the destruction is usually far from complete after many hours, especially if partial vacuum is coincidently employed to effect concentration of the extract. Concentration of extracts in metallic vessels, with heat in vacuo or otherwise, markedly accelerate the destruction of this active substance as well as the other alkaloids.

The new alkaloid is much more stable than the ergotoxine type of alkaloid in crude extracts (either liquid or solid). Oxidation, spontaneous or chemically induced, causes the substance to become yellow, and finally a dark brown. This oxidation is attended by a corresponding decline in oxytocic activity.

Tested colorimetrically by the Smith method, or as modified by the 1932 B. P., the blue color is readily produced. The intensity of the color reaction ranges from approximately 150% up to 230% of that produced by equivalent concentrations of ergotoxine ethanesulphate, depending on conditions of temperature, light intensity and pH.

By this present application I present a purified liquid ergot product containing the new alkaloid and describe below one form of a process by which such purified liquid ergot product may be obtained satisfactorily.

Due to climatic and other conditions, certain areas cannot produce ergot containing the new alkaloid. It is therefore necessary to properly select the raw ergot used.

One kilogram of raw powdered ergot may be first treated with petroleum ether, benzine or gasoline in the proper amount for the purpose of removing the fatty or oily constituents. This defatting of the powdered ergot may be found preferable, but not absolutely necessary for the operation of the present process and the formation of the resultant product.

The powdered ergot, either defatted or not, is exhaustively extracted with 95% alcohol, ethyl, methyl or isopropyl, by continued percolation until one cubic centimeter of the exhaust percolate will not develop a blue color when exposed to direct sunlight after stratification with one cubic centimeter of a 0.125% solution of paradimethyl-amino-benzaldehyde in 50% sulfuric acid.

The alcohol is then removed from the extract by distillation in any suitable apparatus, preferably at reduced atmospheric pressure and at a temperature preferably not in excess of fifty degrees centigrade. Any suitable method which provides for a reduction of volume at low temperature may be utilized for the step of removing the alcohol from the extract.

The resultant residue is thoroughly washed with small divided portions of water acidified to a pH range of from 2.0 to 6.0. For this purpose organic acids such as acetic and lactic acids and inorganic acids, hydrochloric, sulfuric and phosphoric acids, have been found suitable. The washings are continued, with filtration, until the combined aqueous filtered washings total a volume of from six hundred (600) to nine hundred (900) cubic centimeters.

The aqueous liquid may be extracted with an immiscible organic solvent such as chloroform, ether, benzol or the like, if necessary to remove additional amounts of coloring pigments. These solvents may be used to control the color of the preparation without any substantial effect upon its oxytocic activity.

A suitable preservative is now added. Such preservatives as alcohol, glycerine and glycol have been found satisfactory. If the purified liquid ergot product is intended for oral and rectal administration the amount of preservative may range from 10% to 20% if alcohol is used, up to 40% if glycerine or glycol is used, the final limit of volume being, for example, a ratio of one cubic centimeter of the finished product to one gram of the drug. For administration by hypodermic the limit may be a ratio of one cubic centimeter of the finished solution to five grams of the drug. Other ratios may be used.

The resultant liquid product is a clear solution, of faint yellow to orange in color, having a slight but characteristic odor and a pleasant slightly acrid taste. It is substantially free from ergotoxine, ergotamine, ergotinine, ergotaminine, sensibamine and ergoclavine. It contains less than 20% of the irritant or inert extractives present in conventional pharmacopoeial liquid extracts of ergot and contains only the definitely more water soluble active base of ergot substantially free from those active constituents of ergot which require acid for their solution.

It may be desired to have the finished product in the form of paste rather than in solution and under these circumstances the filtered washings are suitably treated until the desired consistency is secured.

The drug as thus prepared is available for oral and rectal administration and for intravenous, subcutaneous and intra-muscular injection as may be determined by the particular needs of the patient under treatment, or it may be reduced to the dry state without further purification, and, with or without the use of excipients or diluents. Its action is prompt and powerful with consistently rapid onset of uterine clonus, and uniformly satisfactory expulsion of the placenta, and a marked reduction in hemorrhage. It gives sustained uterine tone and added freedom from toxicity or undesirable side actions, due to the removal from the drug of the ergotoxine type of alkaloids and the retention of the new alkaloid with its oxytocic activity relatively unimpaired.

The new alkaloid has been subjected to the usual tests to determine the pharmacological action. Of the tests used, those made upon the uterus of lightly anesthetized pregnant cats clearly revealed the differences between the new alkaloid and the hitherto known alkaloids of ergot.

Tested on an isolated uterus of a nonpregnant rabbit the new alkaloid produced prompt uterine contractions and an increase in uterine tonus, parallel in effect to its action upon the human uterus.

It will produce an immediate inhibition of the rhythmical movements of the isolated rabbit intestine without interfering with the activity of epinephrine subsequently applied. In this respect, it differs from those preparations of ergot which contain substantial amounts of ergotoxine which destroy the epinephrine response.

In its response to the well-known cockscomb reaction it is not dissimilar from known ergot products but the instant product is substantially inactive in the Broom-Clark test, differing, in this respect from all other preparations of ergot which include in their composition ergotoxine and ergotamine.

In doses greatly exceeding therapeutic doses it fails to produce the known toxic effects of ergot such as gangrene and in doses greatly exceeding therapeutic doses it fails to produce the known toxic effect of ergotoxine.

What I claim as new and desire to secure by U. S. Letters Patent is:

1. The process of preparing a purified ergot product containing an active water soluble alkaloid of ergot which consists in extracting ergot containing the alkaloid with concentrated alcohol by percolation, removing said alcohol, washing the residue with acidified water and filtering the resultant solution.

2. The process of preparing a purified ergot product containing an active water soluble alkaloid of ergot which consists in extracting ergot containing the alkaloid with concentrated ethyl alcohol by percolation, removing said alcohol, washing the residue with acidified water and filtering the resultant solution.

3. The process of preparing a purified ergot product containing an active water soluble alkaloid of ergot which consists in extracting ergot containing the alkaloid with concentrated methyl alcohol by percolation, removing said alcohol, washing the residue with acidified water and filtering the resultant solution.

4. The process of preparing a purified ergot product containing an active water soluble alkaloid of ergot which consists in extracting ergot containing the alkaloid with concentrated isopropyl alcohol by percolation, removing said alcohol, washing the residue with acidified water and filtering the resultant solution.

5. The process of preparing a purified ergot product containing an active water soluble alkaloid of ergot which consists in extracting ergot containing the alkaloid with concentrated alcohol by percolation, removing said alcohol, washing the residue with water acidified by an organic acid and filtering the resultant solution.

6. The process of preparing a purified ergot product containing an active water soluble alkaloid of ergot which consists in extracting ergot containing the alkaloid with concentrated alcohol by percolation, removing said alcohol, washing the residue with water acidified by an inorganic acid and filtering the resultant solution.

7. The process of preparing a purified ergot product containing an active water soluble alkaloid of ergot which consists in extracting ergot containing the alkaloid with concentrated alcohol by percolation, removing said alcohol, washing the residue with acidified water, purifying the acidified aqueous solution with an immiscible organic solvent and filtering the resultant solution.

8. The process of preparing a purified ergot product containing an active water soluble alkaloid of ergot which consists in extracting ergot containing the alkaloid with concentrated alcohol by percolation, removing said alcohol, washing the residue with acidified water, purifying the acidified aqueous solution with an organic solvent, removing the solvent, and filtering the resultant solution.

MARVIN R. THOMPSON.